United States Patent
Riel

(10) Patent No.: US 9,588,976 B1
(45) Date of Patent: Mar. 7, 2017

(54) DELAYED ALLOCATION FOR A DIRECT ACCESS NON-VOLATILE FILE SYSTEM

(71) Applicant: Red Hat, Inc., Raleigh, NC (US)

(72) Inventor: Henri Van Riel, Merrimack, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/216,831

(22) Filed: Jul. 22, 2016

(51) Int. Cl.
*G06F 17/30* (2006.01)

(52) U.S. Cl.
CPC .. *G06F 17/30091* (2013.01); *G06F 17/30079* (2013.01); *G06F 17/30132* (2013.01); *G06F 17/30135* (2013.01); *G06F 17/30138* (2013.01); *G06F 17/30174* (2013.01); *G06F 17/30867* (2013.01)

(58) Field of Classification Search
CPC ......... G06F 17/30091; G06F 17/30135; G06F 17/30132; G06F 17/30174; G06F 17/30867; G06F 17/30138; G06F 17/30079
See application file for complete search history.

(56) References Cited

U.S. PATENT DOCUMENTS

| | | | | |
|---|---|---|---|---|
| 5,666,532 A * | 9/1997 | Saks | ................. | G06F 17/30067 707/613 |
| 6,128,623 A * | 10/2000 | Mattis | ............... | G06F 17/30902 707/695 |
| 6,292,880 B1 * | 9/2001 | Mattis | ............... | G06F 17/30902 707/999.007 |
| 7,376,679 B2 | 5/2008 | Pasupathy | | |
| 7,457,822 B1 | 11/2008 | Barrall et al. | | |
| 7,979,402 B1 * | 7/2011 | Hamilton | .......... | G06F 17/30088 707/689 |
| 8,903,830 B2 | 12/2014 | Edwards | | |
| 9,015,355 B2 | 4/2015 | Klughart | | |
| 2005/0108296 A1 * | 5/2005 | Nakamura | ........ | G06F 17/30135 |
| 2011/0107053 A1 * | 5/2011 | Beckmann | ............ | G06F 3/0608 711/171 |
| 2014/0025917 A1 * | 1/2014 | Kaczmarczyk | ..... | G06F 11/1448 711/173 |
| 2014/0189212 A1 | 7/2014 | Slaight et al. | | |
| 2015/0378618 A1 * | 12/2015 | Lipcon | .............. | G06F 17/30138 709/226 |

FOREIGN PATENT DOCUMENTS

CN 102790797 11/2012

OTHER PUBLICATIONS

"Ext4 Filesystem" 10 pages, https://www.kernel.org/doc/Documentation/filesystems/ext4.txt.

(Continued)

*Primary Examiner* — Leslie Wong
(74) *Attorney, Agent, or Firm* — Lowenstein Sandler LLP

(57) ABSTRACT

Systems and methods for data storage management technology that optimizes the creation and storage of file objects. The method includes: receiving a request to create a file object; storing a first portion of the file object in a buffer in a first data storage; determining a location in a second data storage in view of a predicted size of the file object; migrating the first portion of the file object from the buffer to the location in the second data storage; and in response to receiving a second portion of the file object, storing the second portion in the second data storage without storing the second portion in the buffer in the first data storage.

20 Claims, 5 Drawing Sheets

(56) References Cited

OTHER PUBLICATIONS

Corbet, Jonathan, The Persistent Memory "I Know what I'm Doing" Flag, Mar. 2, 2016, 5 pages, https://lwn.net/Articles/678011/.
Wilcox, Matthew, "Re: [PATCH v6 07/22] Replace the XIP Page Fault Handler with the DAX Page Fault Handler" Mar. 20, 2014, 7 pages, http://lists.openwall.net/linux-kernel/2014/03/20/676.
Matthew Wilcox, "DAX: Page cache bypass for filesystems on memory storage", Oct. 24, 2014, 4 pages, https://lwn.net/Articles/618064/.
Matthew Wilcox, "Support ext4 on NV-DIMMs", Feb. 25, 2014, 4 pages, https://lwn.net/Articles/588218/.
Walt Hubis, "Developments in the NVM Programming Model", SNIA, Jan. 20, 2015, 28 pages.
Jake Edge, "Persistent Memory", Mar. 26, 2014, 4 pages, https://lwn.net/Articles/591779/.

\* cited by examiner

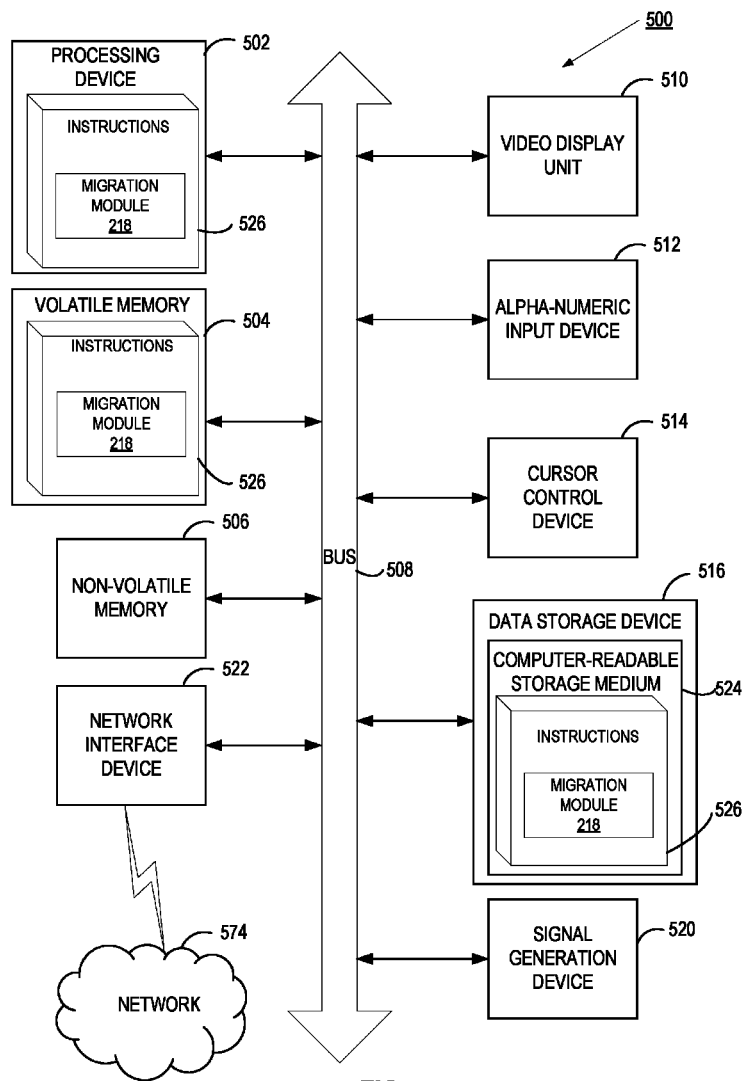

DELAYED ALLOCATION FOR A DIRECT ACCESS NON-VOLATILE FILE SYSTEM

TECHNICAL FIELD

The present disclosure is generally related to data storage management, and is more specifically related to optimizing the creation and storage of file objects.

BACKGROUND

Many computer systems manage data storage using an operating system and one or more file systems. The computer system may create, modify, and remove files from a file system that is stored on a secondary storage (e.g., hard disk). To enhance performance of the file system, an operating system may use a portion of memory as a page cache to buffer reads and writes to the file system. The page cache may enable the operating system to delay operations (e.g., reads and writes) so that multiple operations can be executed together. Traditional operating systems typically store the page cache in volatile memory (e.g., main memory) and the file system in secondary storage (e.g., hard disk).

BRIEF DESCRIPTION OF THE DRAWINGS

The present disclosure is illustrated by way of examples, and not by way of limitation, and may be more fully understood with references to the following detailed description when considered in connection with the figures, in which:

FIG. 5 depicts a block diagram of an illustrative computing device operating in accordance with the examples of the present disclosure.

DETAILED DESCRIPTION

Figure 1:
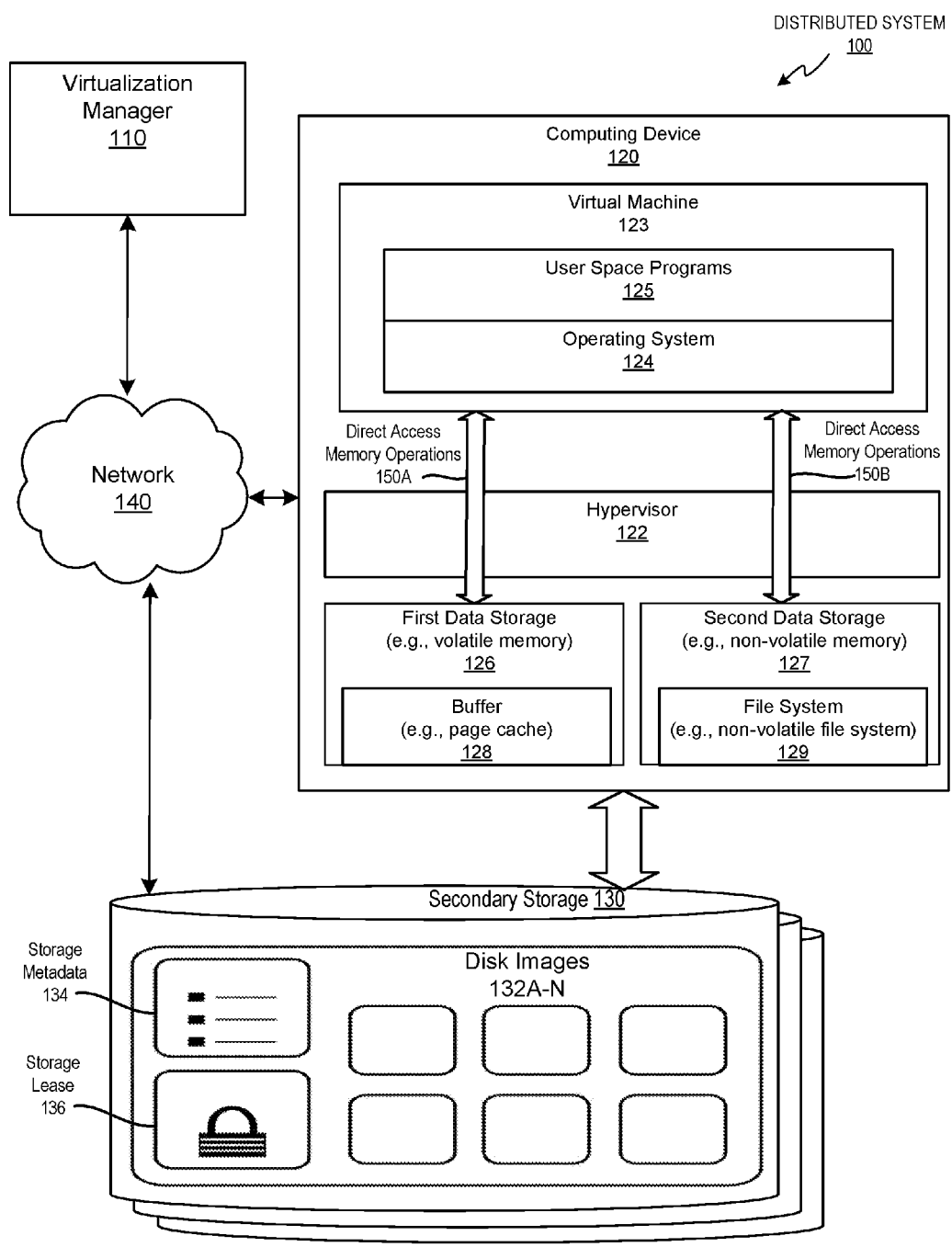
FIG. 1 depicts a high-level block diagram of an example distributed system operating in accordance with one or more aspects of the present disclosure.

Described herein are methods and systems for data storage management technology that optimize the creation and storage of file objects. Many operating systems support the creation of files using a delayed disk allocation technique. The delayed disk allocation technique, which may also be known as allocate-on-flush, is a disk optimization that initially creates a file in a page-cache residing in volatile memory and delays committing the file to disk until all the file data has been received. The delay enables the operating system to determine the size of the file and find locations on disk that can accommodate the file and therefore reduce storage fragmentation. Waiting for the file data may be time consuming and the collective file data from many new files may occupy a large portion of page cache. Some modern operating systems have begun incorporating support for direct access non-volatile memory that allows an entire file system to be stored in memory and may eliminate the need to have page cache, which may prevent an operating system from using the traditional delayed disk allocation technique and may eventually contribute to more storage fragmentation.

Aspects of the present disclosure address the above and other deficiencies by providing an enhanced delayed allocation technique. In one example, a computing device may include a first data storage and a second data storage. The first data storage may be volatile memory (e.g., main memory) and the second data storage may be non-volatile memory. The computing device may receive a request to create a file object and receive multiple portions of the file object. The file object may be a data structure for organizing and storing data and may be a file, a directory, or other object of a data storage system (e.g., file system). The computing device may store a first portion of the file object in a buffer in a first data storage and may predict a size of the file object based on the first portion. The computing device may identify a location in the second data storage based on the predicted size and may migrate the first portion from the buffer to the location in the second data storage. During the migration, the computing device may update the buffer to indicate the new location of the first portion in the second data storage. Subsequent portions of the file object may be directly stored in the second data storage without storing it in the buffer in the first data storage. This may be advantageous because the first data storage may be main memory and this technology may reduce the quantity and duration that the main memory is occupied during the creation of files and may also reduce storage fragmentation of the newly created file objects. This may enable computer systems to use their computing and storage resources more efficiently (e.g., reduce resource waste) and may provide faster access times (e.g., read or write) for file objects, since they may be stored in a more continuous manner.

Various aspects of the above referenced methods and systems are described in details herein below by way of examples, rather than by way of limitation. The examples provided below discuss a virtualized environment, but other examples may include a standard operating system running on an individual computing device without virtualization (e.g., without a hypervisor).

FIG. 1 illustrates an example distributed system 100 in which implementations of the disclosure may operate. The distributed system 100 may include a virtualization manager 110, a computing device 120, and a secondary storage 130 coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Virtualization manager 110 may be hosted by a computing device and include one or more computer programs executed by the computing device for centralized management of the distributed system 100. In one implementation, the virtualization manager 110 may comprise various interfaces, including administrative interface, reporting interface, and/or application programming interface (API) to communicate with computing device 120, as well as to user portals, databases, directory servers and various other components, which are omitted from FIG. 1 for clarity.

Computing device 120 may comprise one or more processors communicatively coupled to memory devices and input/output (I/O) devices, as described in more details herein below with references to FIGS. 2 and 5. Computing device 120 may run a hypervisor 122 that provides computing resources to one or more virtual machines 123. Hypervisor 122 may be any program or combination of programs and may run on a host operating system or may run directly on the hardware (e.g., bare-metal hypervisor). Hypervisor 122 may manage and monitor various aspects of the operation of computing device 120, including the storage, memory and network interfaces. Hypervisor 122 may abstract the physical layer features such as processors, memory, and I/O devices, and present this abstraction as virtual devices to a virtual machine 123 running an Operating system 124 and user space programs 125.

Operating system 124 and user space programs 125 may be any program or combination of programs that are capable of using the virtual devices provided by hypervisor 122 to perform computing tasks. Operating system 124 may include a kernel comprising one or more kernel space programs (e.g., memory driver, network driver, file system driver) for interacting with virtual hardware devices or actual hardware devices (e.g., para-virtualization). User space programs 125 may include programs that are capable of being executed by operating system 124 and in one example may be an application program for interacting with a user. Both the operating system 124 and user space programs 125 may be capable of initiating the creation of file objects and may support direct access memory operations 150A and 150B for accessing one or more data storage devices.

Direct access memory operations 150A and 150B may enable a program to modify a data storage device without interacting with an underlying operating system (e.g., underlying kernel). In one example, direct access memory operations 150A and 150B may enable user space program 125 to access a data storage device without interacting with guest operating system 124. In another example, direct access memory operations 150A and 150B may enable guest operating system 124 to access a data storage device without interacting with hypervisor 122. In yet another example, direct access memory operations 150A and 150B may enable user space program 125 to access a data storage device without interacting with a guest operating system or hypervisor 122.

Direct access memory operations 150A and 150B may be contrasted to non-direct access memory, which may use multiple calls across multiple computing layers to modify a data storage device. For example, user space program 125 may utilize a non-direct access by making a first memory call (e.g., system call) to underlying guest operating system 124 and the guest operating system may make a second memory call (e.g., hypercall) to hypervisor 122. Hypervisor 122 may then make a third memory call (e.g., hardware specific load instruction) to modify the data storage device. In contract, direct memory access operations 150A and 150B may enable a program to modify the data storage devices, such as first data storage 126 and second data storage 127 without using intermediate memory calls (e.g., second and third memory calls).

Support for direct access memory operations 150A and 150B may be provided by a direct access module, which may include features, functions, libraries, or other instructions that are a part of, accessible to, or executed by a user space program 125 (e.g., application), operating system 124 (e.g., kernel), hypervisor 122 (e.g., hypervisor including underlying host operating system), or a combination thereof. In one example, a direct access memory operation may be initiated by making a memory call (e.g., function call) that bypasses the operating system and/or hypervisor and initiates a firmware or hardware based memory instruction of the data storage device (e.g., load or store instruction). Direct access memory operations 150A and 150B may be processed by the same central processing unit (CPU) executing the operating system 124 or hypervisor 122 and may therefore be different then direct memory access (DMA). Direct memory access and direct access memory may be different because direct memory access (DMA) is a hardware feature that enables a hardware subsystem (e.g., graphics card, network card) to modify main memory without interacting with any central processing unit (CPU), whereas direct access memory may use a CPU but bypass any or all of the computing processes associated with an underlying or supporting program (e.g., operating system 124, hypervisor 122).

First data storage 126 and second data storage 127 may be any data storage device that is capable of storing data for a file object. In one example, first data storage 126 and second data storage 127 may be separate data storage devices and first data storage 126 may be volatile data storage and the second data storage 127 may be non-volatile data storage. In another example, first data storage 126 and second data storage 127 may be different portions of the same storage device, which may be either volatile data storage or non-volatile data storage. Volatile data storage may include main memory and the non-volatile data storage may include non-volatile memory (NVM). Non-volatile memory may be computing memory that can provide stored information after being power cycled (e.g., turned off and back on). The non-volatile memory may be direct access memory, which may be also known as DAX memory (e.g., Direct Access eXcited memory).

Direct access memory (DAX) may include non-volatile or volatile memory that supports direct access memory operations and therefore exposes load and store instructions that can be accessed by user or kernel space programs without making a system call or hypercall to an underlying kernel. Direct access memory that uses volatile memory may use the volatile memory in a manner that emulates non-volatile memory. Computing device 120 may emulate non-volatile memory by persisting the data in the volatile memory to a data structure (e.g., file) on persistent data storage (e.g., secondary storage 130). This may enable data storage to appear to a program as non-volatile memory because it may provide access speeds similar to non-volatile memory and provide access to the data after a power cycle. It may be advantageous to use direct access memory for second data storage 127 when creating a file object. This is because the calling process may be able to initiate the creation of a file object using an underlying kernel and main memory, but after the first portion of the file object is migrated the calling process can directly write the remaining portions of the file object without involving the underlying kernel or main memory.

As shown in FIG. 1, first data storage 126 may include a buffer 128 and second data storage 127 may include file system 129. Buffer 128 may include one or more data structures that store file object data before, during, or after it is committed to file system 129. Buffer 128 may be a transparent or intermediate cache that stores data of file system 129. In one example, buffer 128 may be the same or similar to a page cache or disk cache that stores data from secondary storage 130 so that future requests for that data can be served more quickly from the page cache as opposed to contacting secondary storage 130 to fulfill each request.

File system 129 may be stored in second data storage 127, secondary storage 130, or a combination of both. In one example, the file system 129 may be entirely stored in non-volatile direct access memory of second data storage 127 and may be considered a non-volatile file system. A non-volatile file system may be a file system that operates without an intermediate page cache.

In one example, buffer 128 may be a shared buffer (e.g., shared page cache). The shared buffer may be managed by hypervisor 122 and may include data that is shared across one or more virtual machines 123. In one example, the shared buffer may include data that is common to multiple virtual machines, such as, common data structures (e.g., files), common libraries (e.g., shared objects (SO), dynamic link libraries (DLLs)), common configurations (e.g., settings), other information, or a combination thereof. The common data may be provided as read-only or may be modifiable by one or more of the virtual machines 123. When the data in first data storage 126 or second data storage 127 is modified, the computing device 120 may synchronize the modified data (e.g., modified disk image 132A) with the corresponding data in secondary storage 130.

Secondary storage 130 may include any physical storage device that is capable of storing data and providing shared access to data storage space by one or more computing devices. Secondary storage 130 may include block-based storage devices, file-based storage devices, or a combination thereof. Block-based storage devices may include one or more data storage devices (e.g., Storage Area Network (SAN) devices) and provide access to consolidated block-based (e.g., block-level) data storage. Block-based storage devices may be accessible over a network and may appear to an operating system of a computing device as locally attached storage. File-based storage devices may include one or more data storage devices (e.g., Network Attached Storage (NAS) devices) and provide access to consolidated file-based (e.g., file-level) data storage that may be accessible over a network.

As shown in FIG. 1, secondary storage 130 may include disk images 132A-N, storage metadata 134, and storage lease 136. In one example, secondary storage 130 may employ block-based storage and disk images 132A-N, storage metadata 134, and storage lease 136 may be provided by respective logical volumes. In another example, secondary storage 130 may employ file-based storage and disk images 132A-N, storage metadata 134, and storage lease 136 may be provided by one or more respective files.

Disk images 132A-N (also referred to as a virtual disk image) may comprise one or more volumes for storing disk image data. Each disk image may represent a chain of volumes comprising one or more copy-on-write (COW) volumes (which may also be referred to as "layers"). From the perspective of virtual machine 123, the volumes may appear as a single disk image, as hypervisor 122 presents the virtual disk to a virtual machine and implements the associated disk read-write operations. Initially, a disk image may comprise one raw or COW volume, which may be made read-only before the first boot of the virtual machine. An attempt to write to a disk by a virtual machine may modify the disk image or may trigger adding a new COW volume ("layer") to the volume chain. The newly created volume may store disk blocks or files that have been modified or newly created by the virtual machine after the previous volume ("layer") has been made read-only. One or more volumes may be added to the volume chain during the lifetime of the virtual machine. In some implementations, making the previous volume read-only (e.g., responsive to receiving a command via an administrative interface) triggers adding of a new COW volume. The virtual disk device implemented by the hypervisor locates the data by accessing, transparently to the virtual machine, each volume of the chain of volumes, starting from the most recently added volume.

Each of the disk images 132A-N may store and organize information that may be loaded onto a machine (e.g., virtual machine or physical machine) and may be executed by the machine to provide a computing service. In one example, a disk image may be generated by creating a sector-by-sector copy of a source medium (e.g., hard drive of example machine). In another example, a disk image may be generated based on an existing disk image and may be manipulated before, during, or after being loaded and executed. The format of the disk images 132A-N may be based on any open standard, such as the ISO image format for optical disc images, or based on a proprietary format. Each disk image 132A-N may be associated with one or more computer programs (e.g., operating systems, applications) and configuration information (e.g., configuration files, registry keys, state information). The configuration information may include state information that indicates the state of one or more running programs at a point in time or over a duration of time. Each state may be the same or similar to a snapshot of the machine at a particular point in time or over a duration of time. In one example, the snapshot may store the state of a machine in a manner that enables it to be portable to other computing devices, so that when the other computing devices loads the snapshot it may function as if it were running on the original device.

Storage metadata 134 of secondary storage 130 may be employed for storing references to associated volumes (e.g., to parent or child volumes in a copy-on-write chain) and/or other information that may be utilized for volume identification, management, creation, modification, removal, and/or for performing data modification operations (e.g., file operations) with respect to the data stored on the volumes in the secondary storage 130.

Storage lease 136 of the secondary storages 130 may be employed for storing the information that may be utilized for managing access to the volumes in the secondary storage 130. In certain implementations, secondary storages 130 may provide a centralized locking facility (e.g., lease manager) to prevent conflicting access by multiple computing devices. By obtaining a lease from the lease manager with respect to the secondary storage 130, a computing device may receive exclusive access to a portion of secondary storage that would prevent other hosts from accessing the portion while the lease is active. A lease may have a certain expiration period and may be extended by the requestor. Failure to timely extend a lease may lead to the expiration of the lease. The state of the current lease with respect to a given secondary storage may be stored in the lease area 136 of the secondary storage.

In one example, computing device 120 may synchronize portions of first data storage 126 or second data storage 127 with secondary storage 130. The synchronization may involve copying, saving, storing, replicating, mirroring, moving, migrating, or other action to update secondary storage 130 to reflect modifications to data in data storages 126 and/or 127. In one example, the synchronization of data storage 126 and 127 may involve identifying portions of memory that have been modified but have not yet been saved to secondary storage. These portions of memory may be considered dirty memory portions (e.g., dirty pages, dirty blocks). The dirty memory portions may be synchronized with the secondary storage by saving the data in the dirty memory portions to the secondary storage. In one example, the synchronization may be a procedure that is the same or similar to a flush procedure or an update procedure that commits a portion of page cache to secondary storage.

Figure 2:
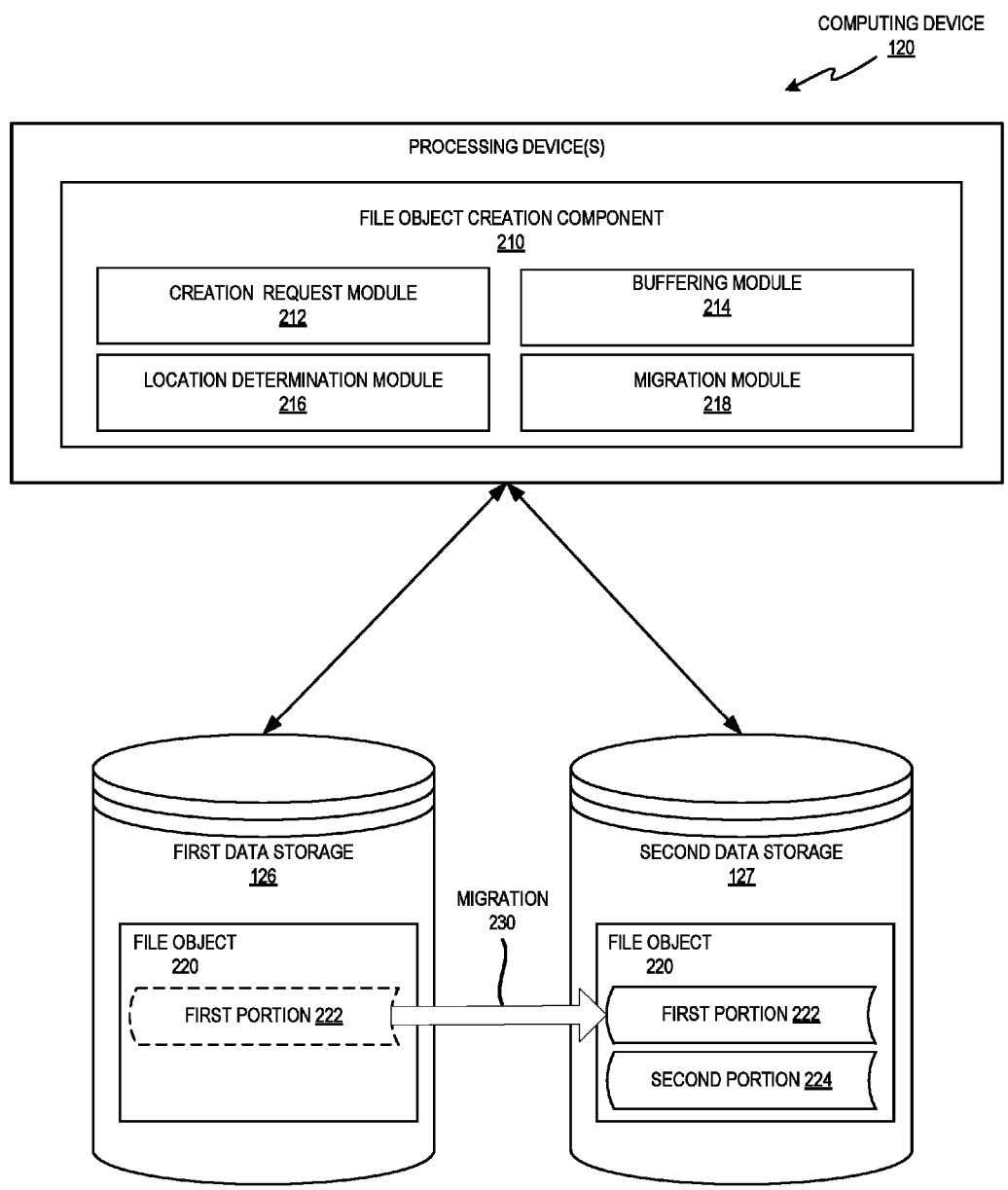
FIG. 2 depicts a block diagram of an example computing device operating in accordance with one or more aspects of the present disclosure.

FIG. 2 is a block diagram illustrating example components and modules of a computing device 120, in accordance with one or more aspects of the present disclosure. In the example shown, computing device 120 may include a file object creation component 210, a first data storage 126, and a second data storage 127. File object creation component 210 may handle computing tasks that optimize the creation of a new file object. File object creation component 210 may include a creation request module 212, a buffering module 214, a location determination module 216, and a migration module 218.

Creation request module 212 may receive a request to create a file object. The request may be received from a user space program, an operating system, a hypervisor, another program, or combination thereof. The request may include one or more portions of the file object. The portions of the file object may include metadata or content of the file object. The metadata may include data about the file object, such as a file name, ownership, permissions, header, format, encoding, parent directory, file system path, creation time, other information, or a combination thereof. The content of the file object may be the data that is stored by the file object, such as textual content, audio content, image content, binary content, other content, or a combination thereof. The one or more portions of the file object may be received before, during, or after the request to create the file object. In one example, the one or more portions of file object may be received as a stream of data.

Buffering module 214 may receive the one or more portions of the file object and may temporarily store the portions (e.g., first portion 222) in a buffer in first data storage 126. The first data storage 126 may be any volatile memory and may be functioning as the main memory for computing device 120. The buffer may be the same or similar to buffer 128 (discussed above) and may be a page cache and store the one or more portions of the file object prior to being copied (e.g., migrated) to another storage location, such second data storage 127 (e.g., non-volatile memory) or secondary storage (e.g., hard disk).

After buffering the one or more portions, computing device 120 may analyze the buffered portions to determine information about the file object. Determining information about the file object may involve identifying information from first portion 222 and using the identified information to predict (e.g., extrapolate, estimate, hypothesize) other information about the file object 220. The identified information may include information gathered directly from first portion 222, such as information within the metadata, content, or a combination thereof, such as the file extension, size of first portion 222, rate the first portion 222 is being received, and other information. The identified information may also include information gathered indirectly from the first portion 222, such as information based on historical data, predictive models, or other techniques. In one example, indirect information may be based on other files objects that have the same or similar ownership (e.g., user account, initiating process), file extension, file name, format, encoding, or other commonality. Some or all of this information may be used to determine size information for the file object. The size information may be an actual size or a predicted size and may be a single size or a size range. The determined information (e.g., size information) may be used by location determination module 216.

Location determination module 216 may use information about file object 220, such as the size information (e.g., predicted size), to determine one or more locations in second data storage 127 to store file object 220. Location determination module 216 may select the one or more locations to reduce or eliminate storage fragmentation. Storage fragmentation (e.g., file system fragmentation, disk fragmentation, file scattering) may exist when a file object is stored in a non-contiguous manner and is often due to storage space availability. For example, second data storage 127 may be partially in use and there may be multiple separate blocks of storage space and no one block may be large enough to store the entire file object. In this situation, file object 220 may be stored in a non-continuous manner across multiple separate storage blocks. Location determination module 216 may select the one or more locations to reduce fragmentation and optimize write time, access time, modification time, other optimization, or a combination thereof.

Migration module 218 may perform a migration 230 of the first portion 222 from first data storage 126 to the one or more locations in second data storage 127. Migrating the first portion 222 of file object 220 may involve locking, moving, copying, saving, storing, replicating, mirroring, synchronizing, or other action to update second data storage 127 to reflect the data of first portion 222. In one example, the migration of the first portion 222 may involve preventing changes during the migration and changes to first portion 222 that arrive during the migration may be denied (e.g., produce errors) and may be resubmitted after the migration completes. In another example, the migration of first portion 222 may be a live migration that does not prevent changes during the migration and may queue the changes during the migration and replay the changes after the migration completes. Completing the migration may involve copying the first portion 222 to second data storage 127 and removing (e.g., dereferencing) first portion 222 from first data storage 126.

Migration 230 may also involve removing a reference in the first data storage that points to a location in the buffer where file object 220 was stored. The reference may be included within a data structure of the buffer (e.g., page cache data structure). In one example, removing the reference that points to a location in the buffer may involve updating the reference within the volatile storage to point to the determined location in the non-volatile storage. In another example, removing the reference may involve deleting the reference from a data structure of the buffer. Computing device 120 may then analyze the file system and repopulate the data structure after the migration completes with a reference that points to the determined location. In either example, computing device 120 may access the reference before, during, or after receiving a subsequent portion (e.g., second portion 224) of file object 220. Computing device 120 may then store one or more of the subsequent portions in second data storage 127 without allowing them to be stored in first data storage 126. In one example, the first portion 222 may be one or more pages in a page cache and the migration may be implemented as a page migration or sequence of page migrations performed by a kernel of either the hypervisor or the operating system (e.g., guest or host operating system).

Figure 3:
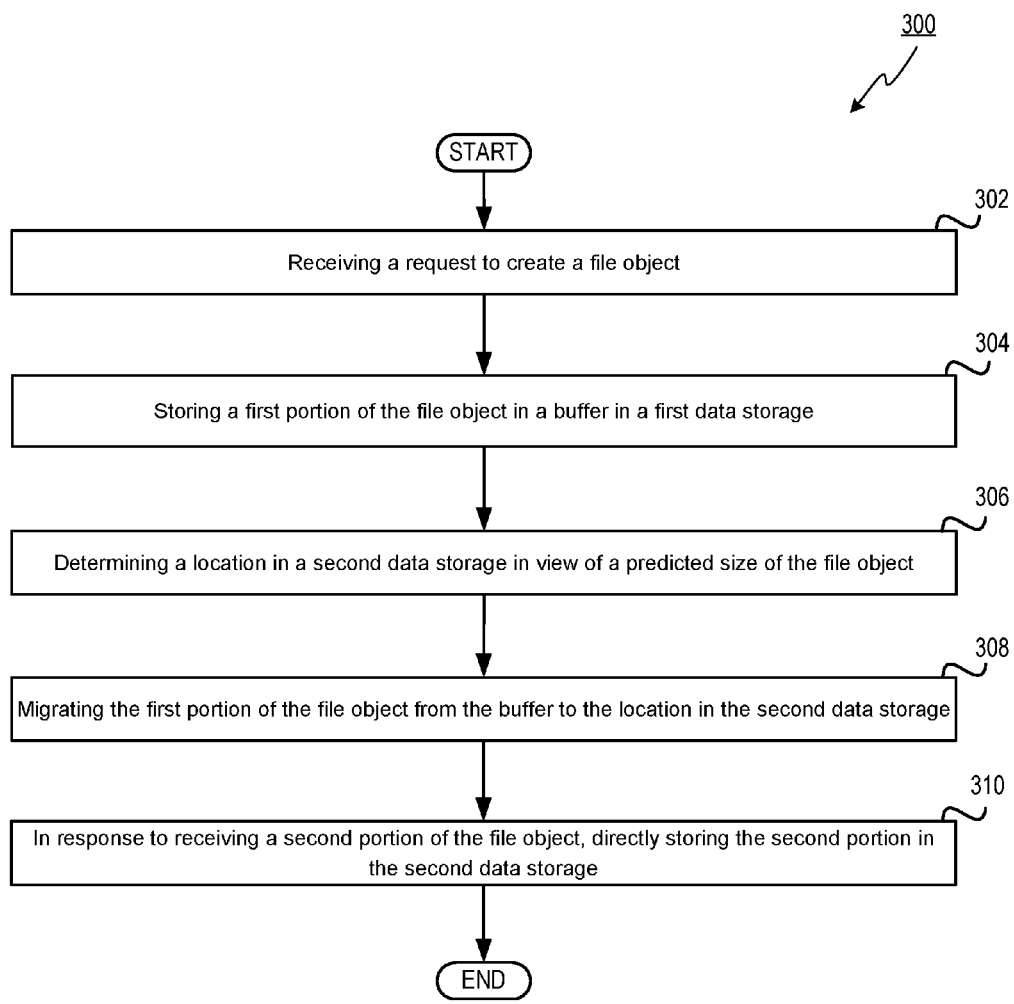
FIG. 3 depicts a flow diagram of an example method for optimizing the creation and storage of file objects, in accordance with one or more aspects of the present disclosure.
Figure 4:
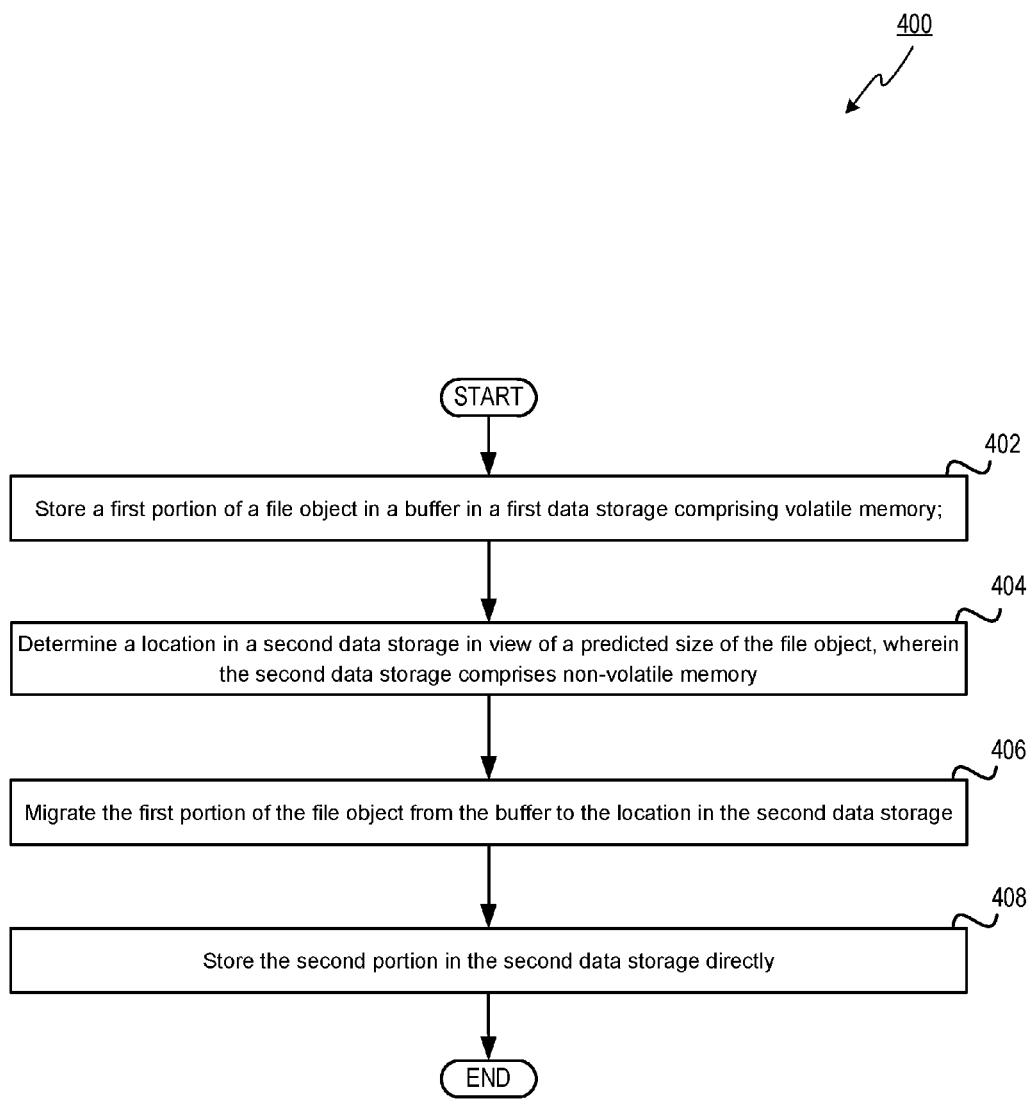
FIG. 4 depicts a flow diagram of another example method for optimizing the creation and storage of file objects, in accordance with one or more aspects of the present disclosure.

FIGS. 3 and 4 depict flow diagrams for illustrative examples of methods 300 and 400 for optimizing the creation and storage of new file objects. Methods 300 and 400 may be performed by processing devices that may comprise hardware (e.g., circuitry, dedicated logic), computer readable instructions (e.g., run on a general purpose computer system or a dedicated machine), or a combination of both. Methods 300 and 400 and each of their individual functions, routines, subroutines, or operations may be performed by one or more processors of the computer device executing the method. In certain implementations, methods 300 and 400 may each be performed by a single processing thread. Alternatively, methods 300 and 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, methods 300 and 400 may be performed by computing device 120 or system 500 as shown in FIGS. 1 and 5 respectively.

Referring to FIG. 3, method 300 may be performed by processing devices of a computing device and may begin at block 302. At block 302, a processing device may receive a request to create a file object. The request may be received by a file system module (e.g., driver or subsystem) from a user space program, an operating system, a hypervisor, another program, or combination thereof. The request may include one or more portions of the file object. The portions of the file object may include metadata or content of the file object and may be received before, during, or after the request to create the file object.

At block 304, the processing device may store a first portion of the file object in a buffer in a first data storage. The first data storage may be any type of volatile memory and may be functioning as the main memory for the processing device. In one example, the buffer comprises a page cache and the page cache may be managed by a kernel of the operating system or hypervisor.

At block 306, the processing device may determine a location in a second data storage in view of a predicted size of the file object. The predicted size of the file object may be determined in view of the first portion of the file object before receiving the second portion of the file object. Determining the location comprises searching for one or more locations in the second data storage that reduce storage fragmentation of the file object. In one example, the processing device may allocate storage space for the file object at the location in the second data storage after determining the predicted size of the file object.

At block 308, the processing device may migrate the first portion of the file object from the buffer to the location in the second data storage. Migrating the first portion of the file object may involve performing a page migration procedure. In one example, migrating the first portion of the file object from the buffer to the second data storage involves copying the first portion of the file object in the volatile storage to the location in the non-volatile storage. The migration may also involve updating a reference within the buffer that points to a location in the volatile storage to point to the determined location in the non-volatile storage and removing the first portion of the file object from the page cache in volatile storage.

At block 310, the processing device may, in response to receiving a second portion of the file object, directly store the second portion in the second data storage. Directly storing the second portion in the second data storage may involve bypassing the buffer and storing the second portion directly in the second data storage without storing the second portion in the buffer in the first data storage. In one example, the processing device may access the buffer to identify a location in the second data structure but may avoid storing the second portion in the first data storage. In another example, the processing device may avoid accessing the first data storage for information related to the file object (e.g., reference) after the migration begins or has completed.

The first data storage may be volatile storage comprising main memory and the second data storage may be non-volatile storage comprising non-volatile memory. In one example, the second data storage comprises direct access non-volatile memory that enables a user space process running on an operating system to bypass a kernel of the operating system and execute a load instruction for the non-volatile memory. In another example, the second data storage emulates direct access non-volatile memory by storing data in volatile memory and synchronizing the data to a file on a secondary storage comprising a hard disk drive. Responsive to completing the operations described herein above with references to block 310, the method may terminate.

Referring to FIG. 4, method 400 may be performed by processing devices of a computing device and may begin at block 402. At block 402, a processing device may store a first portion of a file object in a buffer in a first data storage comprising volatile memory. In one example, the volatile memory may be the main memory of the computing device.

At block 404, the processing device may determine a location in a second data storage in view of a predicted size of the file object, wherein the second data storage comprises non-volatile memory. The predicted size of the file object may be determined in view of the first portion of the file object before receiving the second portion of the file object. Determining the location comprises searching for one or more locations in the second data storage that reduce storage fragmentation of the file object. In one example, the processing device may allocate storage space for the file object at the location in the second data storage after determining the predicted size of the file object.

At block 406, the processing device may migrate the first portion of the file object from the buffer to the location in the second data storage. Migrating the first portion of the file object may involve performing a page migration procedure. In one example, migrating the first portion of the file object from the buffer to the second data storage involves copying the first portion of the file object in the volatile storage to the location in the non-volatile storage. The migration may also involve updating a reference within the buffer that points to a location in the volatile storage to point to the determined location in the non-volatile storage and removing the first portion of the file object from the page cache in volatile storage.

At block 408, the processing device may store the second portion in the second data storage directly. Directly storing the second portion in the second data storage may involve bypassing the buffer and storing the second portion directly in the second data storage without storing the second portion in the buffer in the first data storage. In one example, the processing device may access the buffer to identify a location in the second data structure but may avoid storing the second portion in the first data storage. In another example, the processing device may avoid accessing the first data storage for information related to the file object (e.g., reference) after the migration begins or has completed.

The second data storage may be non-volatile storage comprising non-volatile memory. In one example, the second data storage comprises direct access non-volatile memory that enables a user space process running on an operating system to bypass a kernel of the operating system and execute a load instruction for the non-volatile memory. In another example, the second data storage emulates direct access non-volatile memory by storing data in volatile memory and synchronizing the data to a file on a secondary storage comprising a hard disk drive. Responsive to completing the operations described herein above with references to block 408, the method may terminate.

FIG. 5 depicts a block diagram of a computer system operating in accordance with one or more aspects of the present disclosure. In various illustrative examples, computer system 500 may correspond to computing device 120 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alpha-numeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions for implementing methods 300 or 400 and for encoding migration module 218 and other modules illustrated in FIG. 2.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "detecting," "initiating," "marking," "generating," "confirming," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving a request to create a file object;
   storing a first portion of the file object in a buffer in a first data storage;
   determining a location in a second data storage in view of a predicted size of the file object;
   migrating, by a processing device, the first portion of the file object from the buffer to the location in the second data storage; and
   in response to receiving a second portion of the file object, directly storing the second portion in the second data storage.

2. The method of claim 1, wherein the second data storage comprises direct access non-volatile memory that enables a user space process running on an operating system to bypass a kernel of the operating system and execute a load instruction for the direct access non-volatile memory.

3. The method of claim 1, wherein the predicted size of the file object is determined in view of the first portion of the file object before receiving the second portion of the file object.

4. The method of claim 1, wherein determining the location comprises searching for one or more locations in the second data storage that reduce a storage fragmentation of the file object.

5. The method of claim 1, wherein the buffer comprises a page cache, and wherein migrating the first portion of the file object comprises performing a page migration procedure.

6. The method of claim 1, wherein the first data storage is volatile storage comprising main memory and the second data storage is non-volatile storage comprising non-volatile memory.

7. The method of claim 6, wherein migrating the first portion of the file object from the buffer to the second data storage comprises:
   copying the first portion of the file object in the volatile storage to the location in the non-volatile storage;
   removing a reference within the volatile storage that points to a location in the buffer; and
   removing the first portion of the file object from the volatile storage.

8. The method of claim 7, wherein removing the reference that points to a location in the buffer comprises updating the reference within the volatile storage to point to the determined location in the non-volatile storage.

9. The method of claim 1, further comprising allocating storage space for the file object at the location in the second data storage after determining the predicted size of the file object.

10. The method of claim 1, wherein the second data storage emulates direct access non-volatile memory by storing data in volatile memory and synchronizing the data to a file on a secondary storage.

11. A system comprising:
    a memory;
    a processing device operatively coupled to the memory, the processing device to:
    receive a request to create a file object;
    store a first portion of the file object in a buffer in a first data storage;
    determine a location in a second data storage in view of a predicted size of the file object;
    migrate the first portion of the file object from the buffer to the location in the second data storage; and
    in response to receiving a second portion of the file object, directly store the second portion in the second data storage.

12. The system of claim 11, wherein the second data storage comprises direct access non-volatile memory that enables a user space process running on an operating system to bypass a kernel of the operating system and execute a load instruction for the direct access non-volatile memory.

13. The system of claim 11, wherein the predicted size of the file object is determined in view of the first portion of the file object before receiving the second portion of the file object.

14. The system of claim 11, wherein to determine the location, the processing device is to search for one or more locations in the second data storage that reduce storage fragmentation of the file object.

15. The system of claim 11, wherein the buffer comprises a page cache, and wherein migrating the first portion of the file object comprises performing a page migration procedure.

16. A non-transitory machine-readable storage medium storing instructions that cause a processing device to:
    store a first portion of a file object in a buffer in a first data storage comprising volatile memory;
    determine a location in a second data storage in view of a predicted size of the file object, wherein the second data storage comprises non-volatile memory;
    migrate, by the processing device, the first portion of the file object from the buffer to the location in the second data storage; and
    store the second portion in the second data storage directly.

17. The non-transitory machine-readable storage medium of claim 16, wherein the second data storage comprises direct access non-volatile memory that enables a user space process running on an operating system to bypass a kernel of the operating system and execute a load instruction for the direct access non-volatile memory.

18. The non-transitory machine-readable storage medium of claim 16, wherein the predicted size of the file object is determined in view of the first portion of the file object before receiving the second portion of the file object.

19. The non-transitory machine-readable storage medium of claim 16, wherein to determine the location, the processing device is to search for one or more locations in the second data storage that reduce storage fragmentation of the file object.

20. The non-transitory machine-readable storage medium of claim 16, wherein the buffer comprises a page cache, and wherein to migrate the first portion of the file object, the processing device is to perform a page migration procedure.

* * * * *